(12) United States Patent
Bhalla et al.

(10) Patent No.: US 11,604,883 B2
(45) Date of Patent: *Mar. 14, 2023

(54) SECURITY RISK IDENTIFICATION IN A SECURE SOFTWARE LIFECYCLE

(71) Applicant: 1230604 BC Ltd., Toronto (CA)

(72) Inventors: Nishchal Bhalla, Mississauga (CA); Rohit Kumar Sethi, Toronto (CA); Ramanan Sivaranjan, Toronto (CA); Ehsan Foroughi, Toronto (CA); Geoffrey Charles Whittington, Waterloo (CA)

(73) Assignee: SECURITY COMPASS TECHNOLOGIES LTD., Toronto (CA)

( * ) Notice: Subject to any disclaimer, the term of this patent is extended or adjusted under 35 U.S.C. 154(b) by 361 days.

This patent is subject to a terminal disclaimer.

(21) Appl. No.: 16/881,814

(22) Filed: May 22, 2020

(65) Prior Publication Data

US 2020/0285757 A1 Sep. 10, 2020

Related U.S. Application Data

(63) Continuation of application No. 15/784,072, filed on Oct. 13, 2017, now Pat. No. 10,706,156.

(51) Int. Cl.
*G06F 21/57* (2013.01)
*G06F 21/55* (2013.01)

(52) U.S. Cl.
CPC .......... *G06F 21/577* (2013.01); *G06F 21/55* (2013.01); *G06F 2221/034* (2013.01)

(58) Field of Classification Search
CPC ... G06F 21/577; G06F 21/55; G06F 2221/034
See application file for complete search history.

(56) References Cited

U.S. PATENT DOCUMENTS

| 6,535,227 B1 * | 3/2003 | Fox | H04L 41/28 709/224 |
| 7,096,502 B1 * | 8/2006 | Fox | H04L 63/1433 709/224 |

(Continued)

OTHER PUBLICATIONS

SD Elements: A Tool for Secure Application Development Management Golnaz Elahi et al. Pre-proceedings of CAISE 2011 Forum, pp. 81-88.

*Primary Examiner* — Jason Chiang

(57) ABSTRACT

A system and method for security risk identification in a secure software lifecycle. A knowledge database has a plurality of security elements which are identified for a particular software application depending on software environment and prioritized in a task list. Code vulnerabilities are identified using code scanners, with security requirements updated based on identified vulnerabilities, lack of vulnerabilities for weaknesses covered by a code scanner, potential weaknesses not adequately covered by code scanners, and software environment changes. The system identifies a security requirement that has passed the test of the code scanner, identifies the strength of the code scanner to discover a particular code vulnerability associated with the security requirement, and updates the security requirement to indicate a verified compliance state.

21 Claims, 6 Drawing Sheets

(56) References Cited

U.S. PATENT DOCUMENTS

| | | | |
|---|---|---|---|
| 8,091,065 B2 | 1/2012 | Mir et al. | |
| 8,347,392 B2 | 1/2013 | Chess et al. | |
| 8,528,093 B1 | 9/2013 | Kureha et al. | |
| 8,555,269 B2 | 10/2013 | Huang et al. | |
| 8,584,247 B1* | 11/2013 | Patil | G06Q 10/101 |
| | | | 726/4 |
| 8,726,393 B2 | 5/2014 | Macy et al. | |
| 8,800,042 B2 | 5/2014 | Sima et al. | |
| 8,935,794 B2 | 1/2015 | Brake et al. | |
| 9,021,592 B2 | 4/2015 | Heitzman | |
| 9,058,492 B1 | 6/2015 | Satish | |
| 9,223,984 B2 | 12/2015 | Guarnieri et al. | |
| 9,443,086 B2 | 9/2016 | Shankar | |
| 9,454,659 B1 | 9/2016 | Daymont | |
| 9,507,940 B2 | 11/2016 | Greene et al. | |
| 9,531,728 B1 | 12/2016 | Bennett et al. | |
| 10,360,408 B1* | 7/2019 | Kincaid | G06F 21/57 |
| 10,540,502 B1* | 1/2020 | Joyce | G06F 21/552 |
| 2004/0015728 A1 | 1/2004 | Cole et al. | |
| 2005/0132188 A1* | 6/2005 | Khin | G06F 21/577 |
| | | | 713/166 |
| 2012/0072968 A1* | 3/2012 | Wysopal | G06F 21/577 |
| | | | 726/1 |
| 2012/0254829 A1 | 10/2012 | Bhalla et al. | |
| 2013/0086686 A1* | 4/2013 | Pistoia | G06F 21/50 |
| | | | 726/25 |
| 2014/0136277 A1 | 5/2014 | Bassin et al. | |
| 2014/0189873 A1 | 7/2014 | Elder et al. | |
| 2014/0372988 A1 | 12/2014 | Fanning et al. | |
| 2014/0373157 A1 | 12/2014 | Guarnieri et al. | |
| 2016/0154960 A1* | 6/2016 | Sharma | G06F 21/577 |
| | | | 726/25 |
| 2017/0154183 A1* | 6/2017 | Cox | G06F 21/552 |
| 2017/0337123 A1* | 11/2017 | Wang | G06F 11/3604 |
| 2018/0018459 A1 | 1/2018 | Zhang et al. | |
| 2018/0121314 A1* | 5/2018 | Hardee | G06F 8/43 |
| 2018/0157844 A1* | 6/2018 | Duer | G06F 21/577 |
| 2018/0165457 A1* | 6/2018 | Holz | H04L 63/1433 |
| 2018/0176245 A1* | 6/2018 | Cornell | G06F 21/577 |
| 2018/0198814 A1* | 7/2018 | Brodie | G06F 21/57 |
| 2018/0285571 A1* | 10/2018 | Hanner | G06F 8/71 |
| 2018/0293386 A1* | 10/2018 | Barouni Ebrahimi | G06F 8/70 |

* cited by examiner

SECURITY RISK IDENTIFICATION IN A SECURE SOFTWARE LIFECYCLE

CROSS REFERENCE TO RELATED APPLICATIONS

This application is a continuation of U.S. patent application Ser. No. 15/784,072 filed on 13 Oct. 2017, now allowed, the contents of which are incorporated herein by reference in their entirety.

FIELD OF THE INVENTION

The present invention pertains to a system and method for security risk identification in a secure software lifecycle. In particular, the present method is applicable to software development and the software development lifecycle to identify, prioritize and implement risk mitigation tasks.

BACKGROUND

Information security in software is important for all software applications, including those whose primary function is not security. For software developers challenged with coding and maintaining software, there is an overwhelming amount of security-related information, a variety of tools, and numerous identified and unidentified security risks, weaknesses and vulnerabilities that are frequently updated and whose status and level of risk is constantly changing. Software analysts, developers, and testers are often not trained on integrating security features into their code and potential software breaches are too often brought to the attention of developers during emergency situations and/or during quality review and audit. With the ever-changing electronic security landscape, software requires constant updating with relevant security to reduce security risks and prevent breaches. Prevention of security breaches is often more economical than remediation, however keeping abreast of requirements, fixes and breaches can be onerous during the software development and maintenance lifecycle. Software analysts, developers, and testers can therefore be overwhelmed with the amount of available information and variety of tools they can employ, and be required to consider long lists of security requirements, guidelines, and standards, and to provide tangible and auditable evidence that software products comply with security guidelines. Security guidance documents are also often static and not updated when new technologies and vulnerabilities come to light, becoming outdated within a short period of time.

Software Development Life Cycle (SDLC) is a process of developing information systems through investigation, analysis, design, implementation and maintenance. Commonly reported attacks and known vulnerabilities are often public, though generally subject to a time delay, and accessible for practitioners through web-based portals such as the National Vulnerability Database (NVD), Common Weakness Enumeration (CWE), and Open Web Application Security Project (OWASP). However, despite known software vulnerabilities being public knowledge to both developers and hackers, software developers often lack relevant, timely, and context specific tools and guidance to help them build and maintain secure software. Many security tools focus only on detecting particular vulnerabilities in the source code of a piece of software and are designed to analyze source code and/or compiled versions of code to help find security flaws. However fixing a vulnerability after coding is costly and often difficult. Furthermore, requirements analysts are often not security experts, and therefore often miss opportunities to build security into the earliest part of the software development lifecycle. In addition, large repositories of security and regulatory information can be difficult to navigate, are not tailored to a specific application environment, and are often not subject to commercial grade quality controls. Further, having multiple large and evolving repositories of requirements requires developers not only to select any and all requirements pertaining to a particular application, but also to keep up to date with new information and requirements.

Some efforts have attempted to provide general accountability of security activities or have provided a knowledge base of security advice. U.S. Pat. No. 8,091,065 to Mir et al. teaches systems and methods for generating a threat analysis and modelling tool by performing risk management using a threat analysis model based on elements comprising components, roles, external dependencies, and data. An application task list is generated from a common task list for the application and countermeasures for known attacks to the software application in the application task list. A threat modeler is used to perform a threat analysis of external challenges to the software and modeling involves identifying one or more threats.

Other tools have attempted to solve software security problems by providing detective's tools such as software static analysis and run-time testing applications. United States patent application 2012/0254829 to Bhalla et al. describes a method of providing security guidance in writing software applications including activating a guidance application linked to a computer and a database of security features, the guidance application being operable to present a user with suggestive security content in writing software applications.

There remains a need for a system and method to build security into the requirements, design, development, testing, deployment and maintenance of a software lifecycle by providing more comprehensive security risk identification in a secure software lifecycle.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide and system and method for security risk identification in a secure software lifecycle. In particular, by integrating a security knowledge database, code scanner, and prioritization engine, a prioritized security requirements task list can provide guidance to developers to mitigate risk which is applicable at all stages of the software lifecycle.

In an aspect there is provided a method for identifying security risks in a software application, the method comprising: identifying a software context relating to the environment of the software application; selecting security requirements for the software application based on the software context, the security requirements selected from a database of security elements; generating a prioritized task list comprising the selected security requirements, each of the security requirements comprising instructions to address the security requirement; scanning code of the software application with at least one security assessment code scanner; mapping any code vulnerabilities found by the at least one security assessment code scanner with at least one security requirement and indicating a confidence level of risk identification based on capability of the code scanner to verify a compliance state of the mapped security requirement; and updating any security requirements for which the at least one security assessment code scanner is incapable of verifying a compliance state to indicate an unverified compliance state.

In an embodiment, the method further comprises identifying at least one security requirement that is inadequately found by the at least one security assessment code scanner.

In another embodiment, the method further comprises validating that a security requirement has been remediated with the instructions to address the security requirement; and updating the task list.

In another embodiment, the environment of the software application is one or more of the coding environment and the system environment.

In another embodiment, the at least one security assessment code scanner is one or more of a static application security testing tool, dynamic application security testing tool, interactive application security testing scanners, runtime application security protection scanner, and an Application Vulnerability Correlation (AVC) tool.

In another embodiment, the method further comprises scanning code of the software application with a plurality of security assessment code scanners, each of the plurality of security assessment code scanners selected from one or more of a static application security testing tool, dynamic application security testing tool, interactive application security testing scanners, runtime application security protection scanner, and an Application Vulnerability Correlation (AVC) tool.

In another embodiment, the method further comprises identifying a new security requirement for the software application; scanning the software code of the software application; determining if the new security requirement is adequately identified by the code scanner; prioritizing the new security requirement; and updating the task list based on identification of the new security requirement.

In another embodiment, the method further comprises generating a standards report identifying each security requirement of the software application and how each security requirement has been met.

In another embodiment, the database of security elements comprises regulatory elements.

In another embodiment, the method further comprises prioritizing the security requirements based on one or more of security risk and capability of the code scanner to identify a code vulnerability associated with a particular security requirement.

In another embodiment, the method further comprises regenerating the prioritized task list by updating at least one of the selected security requirements.

In another embodiment, the code scanner identifies at least one software context relating to the environment of the software application.

In another aspect there is provided a system for security risk identification in a software application, the system comprising: a knowledge database comprising a plurality of security elements, each security element comprising an identification of a security risk and a recommended remediation of the security risk; a security element selection module for selecting a plurality of security requirements from the security elements in the knowledge database; a code scanner for identifying at least one code vulnerability in the software application code, the at least one code vulnerability associated with at least one of the security requirements; a prioritization engine for prioritizing the plurality of selected security requirements, the prioritizing based on the security risk of each of the selected security requirements; and a task list generator for generating a task list for the software project, the task list comprising a prioritized list of the selected security requirements.

In another embodiment, the system further comprises a verification module for updating at least one of selected security requirements in the task list once a remediation task has been completed.

In another embodiment, the prioritization engine identifies security requirements that are ineffectively identified by the code scanner.

In another embodiment, the code scanner is one or more of a static application security testing tool, dynamic application security testing tool, interactive application security testing scanner, and a runtime application security protection scanner.

In another embodiment, the system further comprises multiple security assessment code scanners, Application Vulnerability Correlation tools, or a combination thereof.

In another embodiment, the system further comprises a plurality of code scanners, wherein each of the plurality of code scanners is one or more of a static application security testing tool, dynamic application security testing tool, interactive application security testing scanners, runtime application security protection scanner, and an Application Vulnerability Correlation (AVC) tool.

In another aspect there is provided a computing device comprising a processor and a memory coupled to the processor, wherein the processor is configured to execute programmed instructions stored in the memory to: identify a software context relating to the environment of the software application; select security requirements for the software application based on the software context, the security requirements selected from a database of security elements; generate a prioritized task list comprising the selected security requirements, each of the security requirements comprising instructions to address the security requirement; scan code of the software application with at least one security assessment code scanner; map any code vulnerabilities found by the at least one security assessment code scanner with at least one security requirement and indicating a confidence level of risk identification based on capability of the code scanner to verify a compliance state of the mapped security requirement; and update any security requirements for which the at least one security assessment code scanner is incapable of verifying a compliance state to indicate an unverified compliance state.

In another aspect there is provided a non-transitory computer-readable storage medium having one or more instructions thereon for identifying software application vulnerabilities during a software lifecycle, the instructions when executed by a processor causing the processor to: identify a software context relating to the environment of the software application; select security requirements for the software application based on the software context, the security requirements selected from a database of security elements; generate a prioritized task list comprising the selected security requirements, each of the security requirements comprising instructions to address the security requirement; scan code of the software application with at least one security assessment code scanner; map any code vulnerabilities found by the at least one security assessment code scanner with at least one security requirement and indicating a confidence level of risk identification based on capability of the code scanner to verify a compliance state of the mapped security requirement; and update any security requirements for which the at least one security assessment code scanner is incapable of verifying a compliance state to indicate an unverified compliance state.

BRIEF DESCRIPTION OF THE FIGURES

For a better understanding of the present invention, as well as other aspects and further features thereof, reference is made to the following description which is to be used in conjunction with the accompanying drawings, where:

FIG. 4 is an example implementation of software context identification for a specific project;

DETAILED DESCRIPTION OF THE INVENTION

Figure 1:
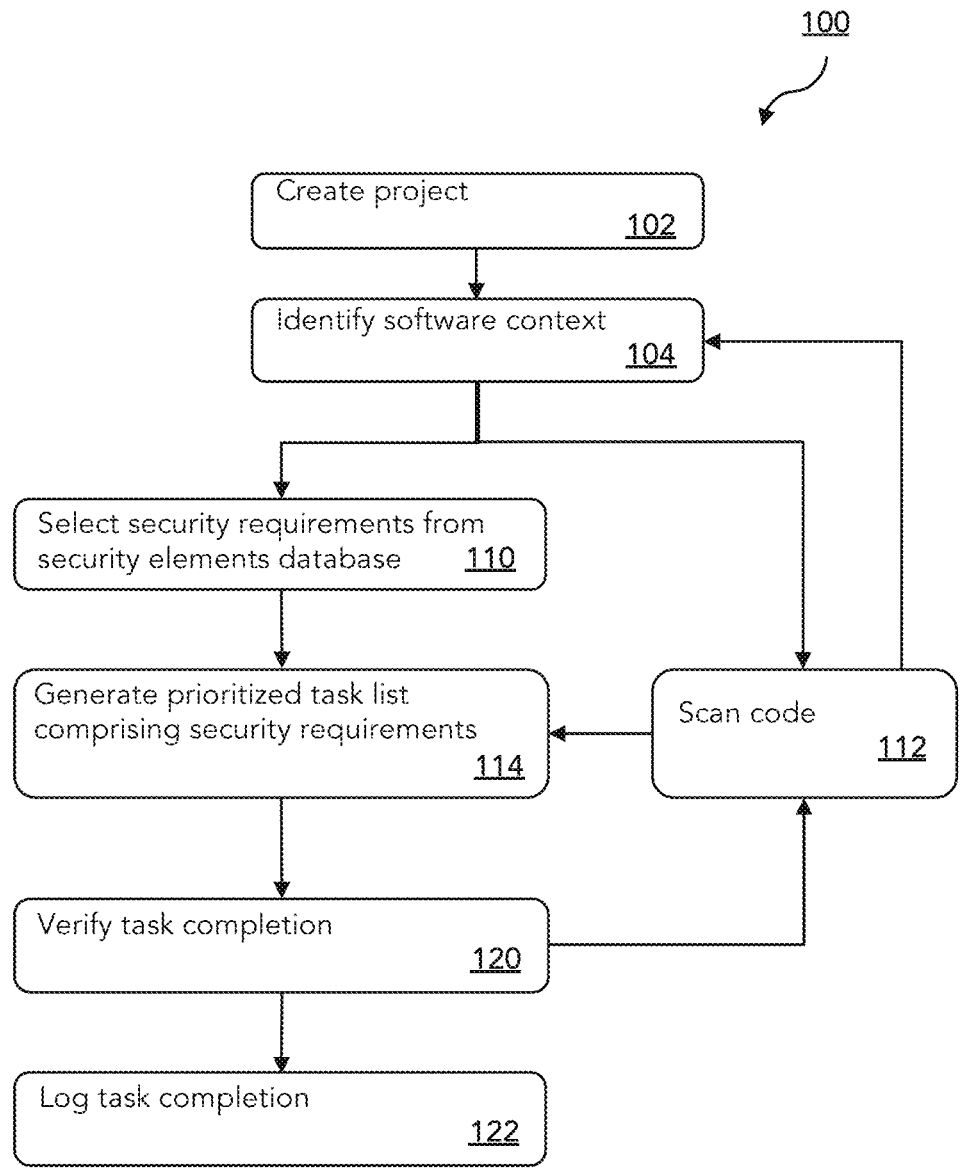
FIG. 1 is a flowchart illustrating a method for identifying security requirements and addressing software application vulnerabilities during a software lifecycle.

Unless defined otherwise, all technical and scientific terms used herein have the same meaning as commonly understood by one of ordinary skill in the art to which this invention belongs.

As used in the specification and claims, the singular forms "a", "an", and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "developer" as used herein refers to anyone involved in the development, maintenance, testing, and/or regulatory aspects of a software application at any point throughout the software application lifecycle. Non-limiting examples of developers include software developers, requirements analysts, programmers, testers, project leaders, auditors, regulatory advisors and security analysts.

The term "weakness" as used herein refers to a general security liability that can occur in a piece of software which can potentially allow an attacker to interfere with or breach the software. A weakness can be a consequence of, for example, a system susceptibility or flaw, attacker access to the flaw, attacker capability to exploit the flaw, or a combination thereof.

The term "vulnerability" as used herein refers to a particular occurrence of a weakness in a piece of software, either in the code or in the application of the code, and that presents a security risk to the particular piece of software.

The term "code scanner" as used herein refers to any tool used to scan code, extract software context from code, capture code vulnerabilities, or detect code deficiencies which can confer risk in a software application or software operating environment. A variety of code scanners are available which provide information on improper, insufficient, or missing information or configurations in the software application which can lead to risk. Some non-limiting examples of code scanners include Static Application Security Testing (SAST) scanners, Dynamic analysis or Dynamic Application Security Testing (DAST) security scanners, aggregating scanners, Interactive Application Security Testing (IAST) scanners, and Runtime Application Security Protection (RASP) scanners.

The presently described method and system provides security risk identification in a secure software lifecycle as well as integrated tools to direct the efforts of developers to build and maintain secure software. In particular, the present method and system is applicable to software development and the software development lifecycle to identify, prioritize and remediate risk mitigation tasks. A centralized security knowledge database and regular updates to the knowledge database provide cradle to grave risk identification and remediation in a software development life cycle. The knowledge database is accessed and provided to developers in fragments or as security tasks based on the specific software context of a software application, including identification of the risk, priority of the task, remediation, and validation of remediation. Security can thus be integrated into the software application from the early phases of the life cycle and maintained throughout its lifetime. By focusing on vulnerability prevention instead of detection, the present system and method provides secure software application development and management throughout the software lifecycle.

Developers are provided with prioritized security and regulatory compliance requirements for addressing security requirements and remediating software application vulnerabilities by embedding security features into their applications. Security testing for security integration with quality assurance tools as a verification of compliance and logging the remediation details can also be provided. In this way, developers can catch security vulnerabilities after deployment, as well as before they are deployed, and incorporate security into the production or release of software by maintaining focus on secure software development and maintenance. Specific technical guidance such as tailored secure coding guidelines and specific technical guidance on avoiding writing insecure code can also be associated with each security task and provided to developers so that more secure code can be written in the first place.

The software context comprises the characteristics of the software environment pertaining to the coding and running of the software application. Categories of the software context can be, for example, technology used, data being handled, legal and other compliance sources, other environmental attributes such as geographical factors, functional requirements that affect security aspects, tools and processes used in SDLC. Specific characteristics of the software context can include but are not limited to programming language, platform, software application technology area, data collected by the software application, data shared by the software application, business domain, regulatory requirements, security standards, technologies used, network architecture, data processed or outputted, legal context (such as where the application is used), operating platform, and custom context described by end-user. Secure programming guidance can be tailored specifically to the software application being written or maintained and integrated with appropriate code scanners to provide multiple opportunities at which to find potential risks.

Integration of at least one code scanner and evaluation of the ability of that code scanner to identify security risks particular to the software application under scrutiny in the present system provides valuable guidance to developers regarding resource allocation and the effectiveness of any integrated code scanners at identifying particular security risks. Although code scanners can be effective at identifying some code vulnerabilities, many vulnerabilities are difficult or impossible to identify with a code scanner, and it is these vulnerabilities that often pose the greatest risk to the security of a piece of software. Even with a full complement of presently available code scanners, it is known that there remain deficiencies where code scanners are ineffective. Knowledge of the effectiveness of particular code scanners to identify security vulnerabilities and integration of this knowledge into the security task list directs developers to more thoroughly validate the remediation of security tasks which are known to be insufficiently caught by code scanners. Tracking the effectiveness of code scanners to identify security risks and assigning a confidence level to each automated validation assists developers with allocation of their time to tasks that require a human intelligence to validate. Allocation of resources based on the confidence level of automated systems to identify vulnerabilities in software also enables deeper verification of vulnerabilities that code scanners are not good at finding.

Based on the software context of the particular project, the present method and system select security elements from a knowledge database and provide tailored relevant security requirements for a particular project and/or industry. The security elements in the knowledge database are a collection of potential risks that may affect the security of a software application combined with their mitigating controls. In the mitigating controls are technology-specific guidance for developer use to address the potential risk. The knowledge database comprises a multitude of security elements, each directed to a different security risk. Based on the software context, a list of security requirements is selected from the security elements in the knowledge database, where the selected security requirements are applicable to the software application under development or maintenance. A task list with each security requirement can include tailored relevant test cases and sample quality assurance test code, including tracking and audit trail information for satisfying requirement standards and audit criteria. For example, if the software application is used within a financial institution having credit card transactions, the task list would include regulations and control frameworks such as the Payment Card Industry Data Security Standard (the "PCI DSS"), COBIT, ISO 27001 (formerly 17799), GLPA, and the like. In another example, if the project is related to the healthcare industry, privacy regulations for medical data can be put in the task list. The knowledge database may further include best practice rules concerning the design of software code to produce software applications as well as rules concerning security structures and procedures for communication on the Internet and for particular businesses.

Code scanners can be used in the present system and method to identify security weaknesses or risks that can be identified by robots and identify tasks that can be verified by robots. Code scanners can also be used to scan existing software application code and identify, define or update the context environment of the software application being scanned and/or identify security requirements for the software application, in some cases without the assistance of developer input. By identifying what vulnerabilities, context information, and security identification code scanners are effective at extracting and identifying and which they are not, human developers can be directed to focus more expensive human testing resources on issues not well caught by automated code scanners.

Developer and management teams can also be provided with real-time visibility of a project's verification status during production. By integrating a security knowledge database with security information and event management (SIEM) tools, the present system can also be configured to update the verification status of project tasks and security status of software applications, both during software development, after launch, and throughout the software application lifecycle. The system can also intake or consume security risk feedback during runtime or during an operational context so that it can influence which security elements are most relevant to the application and reprioritize them according to the immediate security environment and add security requirements to a prioritized task list for attention by a developer. Appropriate teams and/or developers can also quickly respond to any feedback or changes to the prioritized security requirements task list to change focus and mitigate risk according to best practices. Task prioritization can also be rapidly adjusted based on the public electronic security environment of the software application to direct developer attention to issues that require more immediate attention at any point during the SDLC. Once the application has been launched, security updates to the knowledge database can trigger software application updates based on the identified software context of the application to maintain the security standards and mitigate risk of the software application during its lifetime. The centralized security knowledge database covers all life cycle phases, from application birth to deprecation, accordingly security is built into the software application from the early phases of the life cycle and maintained as the knowledge database is updated with security and regulatory updates.

FIG. 1 is a flowchart illustrating a method 100 for identifying security requirements and addressing software application vulnerabilities during a software lifecycle. The method shown in FIG. 1 can be done at any point during the software lifecycle, including but not limited to during the design phase, development phase, test phase, deployment phase, maintenance and update phase, and replacement, obsolescence or deprecation phase. A software application project is first created 102. The project can pertain to a new software application, such as a new application being developed, or can pertain to an existing software application. For any project, the software context is identified 104 so that generation of security requirements pertaining to the particular project or software application can be extracted from or delivered by the knowledge database to assist the developer to incorporate security requirements into the software. The software context describes the characteristics of the software application, including but not limited to the language, function, regulatory requirements, and connections of the software application. The software context of the application can also define the nature of the project, security features, users of the application, access restriction settings, types of information being handled by the application, business drivers and policies, platforms, privacy requirements, technologies, programming languages, application interfaces, type of application, type of web server(s) used, integrated third party technologies and libraries, and other integrated technologies. By collecting context information about the software application, a customized set of guidelines and requirements can be automatically retrieved from the knowledge database which is relevant to the specific project.

In creating a new project, the system provides a developer with a list of software context descriptors from which the developer can identify the context of the software application. The software context can encapsulate both technical as well as business or process domains, and can comprise inclusion rules which relate to rules used in other parts of the system. Rules can be composed of Boolean operators and project properties, for example, the application uses Java AND application is web-based. The system can also provide questions and display answers to gain an understanding of the context of the software. Questions can include inclusion rules so that the system only asks relevant questions, for example, only ask what version of Java you are using after you specify that you have indeed been using Java. The identified software context enables the knowledge database to refine a cascading set of further questions as well as retrieve relevant security guidelines and requirements for developing a secure software application. In one example, selecting the language "Java EE profiles" from a list which includes Java, Tomcat, Apache, brings forward a set of pre-populated attributes pertinent to Java EE profiles for the project. Project attributes can be itemized and accessible to stakeholders, for example, identification that Apache Struts was being used in the software application, and guidance specific to Struts that supports Struts can be provided via the knowledge database.

Once code has been written for the project, the software context can be further discerned from code scanned by the system 112. The software context of the software application discerned using details gleaned from at least one code scanner can add security requirements directly based on vulnerabilities found, or by identifying software context from the scanned code and mapping specific details identified by at least one code scanner to the software context. In one example, a code scanner can identify the language, security application code, and other frameworks or technology integrated into the software. Meta-information assigned by users of the code scanners such as business risk, business unit, industry, personnel, and other information particular to a software application may also be discerned by scanning the software application code.

Developers can also provide more details about the context and functions of the project, for example, by specifying whether the application being developed involves interactions with an operating system, file-upload function, authentication of end users, etc. In another example, one software feature can be "application uses Java" and another might be "application must comply to Payment Card Industry Data Security Standards", and a security requirement will be selected 110 based on the intersection of the combination of context information.

A centralized knowledge database contains a central repository of updated security and regulatory requirements which is provided to developers based on the requirements identified for their particular project. Accessing the knowledge database occurs throughout the SDLC project software development and maintenance process to provide and up-to-date security guidance for the software application. The knowledge database is a knowledge repository of security guidelines accessible with a retrieval tool, and integration with the knowledge database occurs throughout the SDLC, such as during creation of the project, and during the requirements phase, design phase, development phase, test phase, deployment phase, maintenance and update phase, and replacement, obsolescence or deprecation phase.

A list of security requirements for the project is selected 110 based on the software context identified, where the selection is from a list of software elements in the knowledge database. Security requirements for the software application are also selected 110 according to current known weaknesses for different technologies, platforms, and languages and in accordance with security and regulatory standards, as applicable to the software project. The security requirements delivered by the database of security elements to generate the task list for the project can relate to, for example, general relevant security requirements, guidelines on secure architecture design, general development standards for different development platforms and technologies, sample tested code for implementing the standards, lists of security test cases and/or check lists to enable non-expert developers to systematically test security requirements, teaching modules, Application Lifecycle Management (ALM) tracking, and bug tracking integration tools such as, for example HP Quality Center, Atlassian JIRA™, CA Agile Central, IBM Rational Team Concert, and Microsoft Team Foundation Server.

Once code has been written for the project, code scanner integration 112 is engaged to scan the software code during and after development to identify risks and to suggest architecture to address and/or remediate potential risks. Scanning the software application code 112 can identify one or more code vulnerabilities, which can be mapped to one or more security requirements to provide a recommendation to the developer on how to remediate the code vulnerability. Scanning the project's software code 112 can also be used to identify and/or update one or more aspects of the software environment or context of the software application 104 such that security requirements can be selected from the elements list as applicable to the software application. The security requirements task list for an application can also be updated based on code scanner data. This capability allows developer teams to avoid missing profiling data about their application and to more accurately track the risk profile of their project using the integrated code scanner(s).

During the development phase of an application software, scanning the code 112 can identify vulnerabilities using automation such as, for example, Static Application Security Testing (SAST) and Dynamic Application Security Testing (DAST) security scanners. SAST is a method of computer program debugging that is done by examining the code without executing the program, and involves looking at the source code and theorizing about security vulnerabilities or spotting design and construction flaws with potential for vulnerability. DAST involves the testing and evaluation of a program based on execution. DAST can also involve operational testing, and is sometimes referred to as "behavioral testing" in that testers often find problems that are not specifically linked to a code module but occur during use. A variety of code scanners can be integrated into the present system, including but not limited to Static Application Security Testing (SAST) scanners, Dynamic analysis or Dynamic Application Security Testing (DAST) security scanners, aggregating scanners, Interactive Application Security Testing (IAST) scanners, and Runtime Application Security Protection (RASP) scanners. Runtime security testing tools can also be incorporated to generate rules for runtime testing and the security task list dynamically updated.

Scanners use heuristics and automated means to explore the behaviors of a software application to detect weaknesses.

A variety of code scanning tools available for security scanning can be synchronized with the present system, however it is evident that no single tool, or even a combination of tools, is capable of finding all security vulnerabilities in a piece of software. Code scanners can be effective at consistently finding what they've been configured to find, however challenges with these tools can often occur. In an example, during code scanning, the software application code is scanned to identify code vulnerabilities, and the results of code scanning by one or multiple code scanners can then added to the security requirement elements in the security task list. However, an integrated code scanner can only identify weaknesses that it has checks to find. Without the context of how effective these checks are, determining which security tasks have been adequately addressed and which have not can be challenging to determine. Also, only some weaknesses that a particular code scanner checks may be relevant to a particular software application. Having a passing code scan from a scanning tool can communicate the wrong impression that an application is free of weaknesses, when in fact the code scanner result indicates only that the code scanner failed to identify any vulnerabilities in the software code for the weaknesses it was capable of finding. For this result, there is no indication of which security tasks could have been verified by the code scanner, which would not have been found, or how effective the code scanner is at identifying particular security vulnerabilities. Each code scanner can further lack visibility of certain weakness information about the project application and is prone to triggering false positives. A combination of code scanners can provide additional coverage, however their heuristics and loose checks are a source of constant pain for developer teams who need a reasonable level of confidence that a security task is addressed, and guidance is required regarding which vulnerabilities are not identified or are poorly identified by the combination of integrated code scanners.

Operationally, any given code scanner will only identify a subset of the total set of vulnerabilities that may exist in the software. If the scanning tool(s) used is ineffective at finding a particular code vulnerability, the scanner does not provide an indication to the developer to check the software application where the scanner is ineffective. The subset of unidentified or hidden vulnerabilities can be very large, and identification of the subset of hidden vulnerabilities unidentifiable by the one or more code scanners increases the fraction of total software vulnerabilities directs developers to more carefully scrutinize these hidden vulnerabilities by another means. Identification of the strength of each of the integrated code scanners to discover a particular code vulnerability and associating security requirements that each code scanner is successful at finding with its associated automated scanner verification provides a level of confidence for each security task requirement that the code scanner will have discovered a particular vulnerability in the code. Integration with multiple code scanning tools in combination with identification of known weaknesses that may not be found by automated code scanning provides a more comprehensive security guidance for preventing software vulnerabilities and efficiently allocating developer resources. Advanced and dynamic synchronization with code scanners can provide additional capabilities, including automatically updating the security requirements task list based on vulnerability information from the scanning tool when the code scanner is updated, and updating the project settings automatically based on the vulnerability or metadata details discerned from the scanning tool. For any vulnerability identified by a code scanner, if the vulnerability does not map to a corresponding task in the security requirements task list for the project, the security task list can be automatically updated to include it as an additional security requirement in the security task list for the project to ensure that it is addressed by a developer.

Application Vulnerability Correlation (AVC) tools can consume security findings from multiple scanners and provide a single view into the weakness posture of an application. Two examples of AVC tools are ThreadFix™ and CodeDX™. Integrating with AVC tools can be problematic as they can trigger false negatives. For example, consider an AVC tool which consumes scan data from scanner tools tool1 and tool2. In this case, the AVC tool returns all identified vulnerabilities for a software application whether they are originally derived from tool1 or tool2. Using a single mapping file for integration with an AVC tool, as defined above, can result in false negatives. For example, a verification result of "pass" can be a false negative when security requirements are marked as verified when they are not, on the basis that the integrated code scanners are incapable of detecting or identifying whether the security requirement has been met. Instead, by mapping each vulnerability identified by each integrated code scanner to a particular security element to provide a security requirement for the application, false negatives can be avoided. In particular, by providing tool-specific mappings when integrating with code scanner and/or AVC results during integration, the system introspects the scan data feed of the AVC and pulls out the specific instances of vulnerability detection for each code scanner, mapping each instance to at least one security requirement such that it is specific to that tool only. Each code scanner tool can be mapped in the knowledge database to a set of security requirements for which it can effectively identify the associated weakness. During software code scanning, by extracting the results of the individual code scanners from the aggregate and examining the findings for each specific scanner, the results can be mapped to the security requirements based on the coverage of each individual tool. The subset of requirements known to be effectively addressed by each tool can be identified and the remaining subset not covered by the tool aggregate can also be identified as not covered by the AVC scan result or aggregate of tool scanners employed. By identifying security requirements not covered by the aggregate of code scanners, these security requirements can be prioritized for human verification.

Once the security requirements have been identified, the security requirements are prioritized 114 by a prioritization engine to provide a prioritized task list comprising development guidelines and security requirements for the project. The prioritized or ranked security task list can be weighted, for example, based on security risk, most expedient order for software design, lifecycle stage of the project or software, test coverage by code scanners, or a combination thereof. To generate the prioritized security task list, the prioritizing engine catalogues a set of weaknesses identified by an integrated code scanner, denoted as W:

$$W=\{w_1, w_2, \ldots, w_k, \ldots, w_n\}$$

A weakness w∈W is associated by the prioritizing engine with zero or more tasks tin the security elements list. The security elements list is denoted as T:

$$T=\{t_1, t_2, \ldots, t_j, \ldots, t_m\}$$

The set of associations is denoted as a set of tuples A:

$$A=\{(t,w) | t \in T, \text{ and } w \in W, \text{ where } t \text{ controls or mitigates weakness } w\}$$

A tuple (t,w) identifies a task tin the list of security elements which controls or mitigates a particular weakness w, which is identified as a required security task either by the software context or by one or more code scanner.

The security requirements task list can further be generated based on the code vulnerabilities identified by at least one code scanner combined with the confidence level of the ability of each code scanner to identify particular vulnerabilities, and the general security requirements generated from the identified software context for the particular software application. The prioritizing engine further provides a confidence level of whether a particular security task can be adequately verified to be complete based on knowledge of the ability of a particular code scanner to find instances of vulnerability of the particular security task. The ability of a code scanner to find instances of a vulnerability is captured by a confidence c. The set of all confidence values is denoted as C:

$$C=\{c_1, c_2, \ldots, c_b, \ldots, c_q\}$$

A confidence $c \in C$ is assigned to each $a \in A$ to generate a set of (t,w,c) tuples, denoted as M:

$$M=\{(t,w,c)|t \in T, \text{ and } w \in W, c \in C, \text{ where } t \text{ controls or mitigates weakness } w, \text{ and } c \text{ is the degree to which detection of } w \text{ by the scanner fully addresses } t\}$$

The confidence c tracks the degree to which the detection of the weakness by the integrated code scanner fully addresses the security task. Confidence c can also be thought of as a measure of how well the integrated code scanner is capable of detecting weakness w in the application software code. In one example, the confidence level c for each security task can be assigned as one of "low" or "high". In this case the set of all confidence values C is denoted as $$C=\{\text{"low","high"}\}$$

and $c \in C$ is assigned a value of "low" or "high". In this case, in a ranking of "low" the code scanner tool is known to only be capable of finding a subset of the weakness, or only in certain instances. In a ranking of "high" the weakness covered by the tool is known to be found in most instances of a particular weakness. In another example, the assigned confidence level can have a variable ranking on a larger scale (such as, for example 0 to 5, 0 to 10, or other scale) to provide a more granular ranking system of confidence in capability of the integrated code scanner to detect a particular vulnerability or address a particular security requirement. Tool scan feedback is imported into the project security task list, and incorporated into the list of tasks, with each code vulnerability identified by a code scanner associated with at least one security task in the security task list. Combined with tool scan feedback and the set of (t,w,c) tuples M, the prioritization engine identifies the confidence that a security task from the project security task list is verified complete by a code scanner.

The list of code vulnerabilities identified by the integrated code scanner(s) is mapped onto a security element and if not already, added to one or more security requirement in the security task list. Each vulnerability identified by each integrated code scanner is checked in the system mapping and the associated security element is brought into the security task list. If the vulnerability identified by an integrated code scanner exists in the mapping, the corresponding task is marked with a Verification Fail. If the vulnerability identified by the integrated code scanner does not exist in the system mapping, an additional security requirement is added to the task list associated with the found code vulnerability, indicating that the code scanner has found a Verification Fail. The new security requirement is also prioritized in the task list. Verification failures found by a code scanner may also be searchable in the task list such that found code failures can be brought forward for attention and remediation, and developer actions can be directed to work on certain security requirements identified by the code scanner(s).

Prioritization of the security requirements 114 can also be based on a quantitative measurement algorithm (such as the CVSS Database) for denoting risk for a particular weakness, confidentiality, or integrity (software inaccessible for modification, only by authorization). Prioritization provides a list of applicable security elements risks and prioritizes developer work to be done to mitigate risks. The prioritized task list can also be dynamically updated based on an updated code scan result that identifies additional vulnerabilities and/or updated software context. As previously described, indirect and/or further prioritization can be done also in light of the results of a code scanner, Application Vulnerability Correlation tool, or other verification integration tool. Prioritization of verification work in the security task list can be further based on verification that a security risk was addressed, and identification of risks or controls that require identification, remediation, and/or validation using manual means. Risk ranking of application tasks can be further based on the inherent risk of the technology stack. A risk number is preferably assigned to each security requirement for the project. A secondary rating can also be provided that describes the reduction of risk once compensating controls are in place. In one embodiment, a combination of risk number and secondary rating can be used to generate the prioritized task list.

Each security requirement on the security task list is provided with an explanation of the security risk and guidance for remediation for addressing the security requirements and/or code vulnerability. Security remediation guidance is based on the identified software context, output of code scanning, or a combination thereof, and centralized guidance is generated and provided by the knowledge database. The provided remediation task guidelines are preferably provided with a corresponding entry or pointer in the Common Weakness Enumeration (CWE) list of vulnerabilities. Best practices and existing standards from, such as Common Weakness Enumeration (CWE), OWASP Top 10, Web Application Security Consortium (WASC) threat classification, empirical data about commonly-exploitable weaknesses in applications based on years of penetration testing, threat models, and source code review can also be included in the task guidelines to assist developers in addressing the security requirement and/or remediating the code vulnerability. Guidance at each phase can also be broken into individual standards. Software development elements can further provide a super set of industry and custom development guide to encompass threads of the CWE and WASC threats classification. As the knowledge database is dynamically updated, the security task list can also be dynamically updated such that attacks against code are routinely assessed and incorporated to the guidance standards of the system. Teaching modules and links to regulatory compliance requirements including PCI DSS, HIPPA HITECH, GLBA, NERC CIP, and international privacy laws can also be provided in the task guidelines to assist developers by putting all requirements in a single location.

Non technology-specific advice can also be provided in the security requirements in the knowledge database, such as how to mitigate particular weaknesses at a particular phase of the SDLC. In one example, code can be provided regarding how to avoid Cross Site Scripting. Other tasks can relate to technology-specific advice that relates to particular standards, for example, particular advice on how to use the Microsoft Anti-XSS library to mitigate Cross Site Scripting for ASP.NET. Task list implementations may also feature attachments such as code samples. Guidance can further be provided to different stakeholders in the SDLC, and may be accessible by a standard, customized or filtered view. For example, requirements analysts can be shown or can sort for security requirements for the project, system architects can view advice or guidance on the design of the application, and testers can be shown how to test against security requirements. Tailored, relevant security coding guidelines and code samples for a large variety of common programming languages, frameworks, platforms and other technologies can also be provided. Positive code examples and complete code examples may be imported or shown to address a security task or vulnerability. Developers can download the code examples and try them or run them for themselves, for example in an integrated development environment (IDE) such as Eclipse, where they can view the complete code, and even run the full program to see the standard in action.

Once the developer has addressed a security task from the task list, a verification procedure 120 guides a developer in testing the application software to ensure that the task has been adequately addressed, which can also be provided in the security requirement guidelines. The guidelines for each security requirements task preferably contains an identification of the security or regulatory problem to be solved, the solution, and a verification procedure, all in a single location for ease of implementation, understanding and integration by the developer. During validation that the requirement has been completed, a security test can provide and/or automatically run routine test cases relevant to the particular software application and identified vulnerability or potential weakness. Developers can further specify the testing suite, and the system can provide guidance on how to test that particular suite. A Quality Assurance (QA) testing tool can also be provided that includes testing standards as test cases into QA testing systems so that QA staff can keep track automatically run scripts and keep track of test coverage and pass rate. In one example, if a developer is using WebInspect™, for example, they will get standards on how to test for a particular weakness with WebInspect™, or alternatively to notify a user if the weakness test is done automatically.

A variety of verification tools, as well as manual verification, may also be used to confirm that a particular security task or requirement has been adequately addressed. Multiple methods can be used to combine the verification information from different scanner tools and methods about a security task into a single verification result. If multiple scanners are being used to scan the software code, feedback from the multiple tools can be aggregated to provide a single verification result and associated confidence value, provided that each of the multiple tools has been confirmed as effective at identifying the vulnerability for which it is indicating a passing verification result. The verification result can appear as a flag inside a task view of the prioritized task list, within the requirement task, or at multiple locations on the system graphical user interface. It is understood that various methods and categories may be used based on the verification tools used and the desired result of the verification.

The system can also identify security tasks from the security task list that require additional verification, and reprioritize tasks accordingly. Verification can be done manually or by using a different type of tool or different code scanner depending on the security task. In an example, it may be known that a particular scanner has high confidence capability for scanning or verifying a particular task, and that scanner may be called upon or brought online to verify that the security task has been completed. For each security task, the system can also track whether the security task requires manual testing, and which scanning tools can be relied upon to verify compliance.

The security task list can be updated with the status of the security tasks therein based on the verification status of each of the listed security tasks. In one example, a task can be marked with a verification status of "To Do" or "Done" based on the verification results. If a task has passed the test of a code scanner which is known to be capable of detecting and confirming the verification or if a human check has been thoroughly done to confirm no vulnerability, then the task will be marked "Done". In all other cases, such as when it is known that the code scanner is not robust or not capable at detecting a particular vulnerability the task will remain marked "To Do" such that further effort can be applied to verify that the task has been properly addressed. Further effort may entail integration of one or more additional code scanner, human verification, or a combination thereof. In another example, a verification status can be multi-fold, and be given one of a plurality of status levels, such as "Verification Pass", "Verification Fail", "Verification Partial Pass", or "Pass". In this example, a task marked as "Verification Pass" indicates that the integrated code scanner(s) or manual test(s) did not identify any vulnerabilities and that there is a low likelihood of a false negative with supported technologies. A security task with a "Verification Pass" can be further assessed as low risk and adequately addressed. A task marked as a "Verification Fail" indicates a vulnerability was identified by at least one integrated code scanner, a security task has not been completed correctly or must be addressed, and that the task should be worked on or scrutinized again. The task is thus assigned an incomplete status. A security task marked with a "Verification Partial Pass" indicates that its controls and mitigation instructions need additional effort to confirm it as verified. Manual testing or another scanner may fill the gap and address any incomplete work. A security task can also be marked as a "Verification Partial Pass" if the integrated code scanner or manual test did not identify any vulnerabilities and there is some likelihood of a false negative. Alternatively, a rating of "Verification Partial Pass" can mean that the code scanner(s) used or manual test is only capable of testing a portion of the potential vulnerability. It is recommended that the security element be tested by additional manual testing to confirm that the security element has been properly addressed. For example, if the task is assigned an incomplete status further effort may need to be expended to confirm that the security task has been fully completed. A security task can also be marked with a "Verification No Status" where no verification status is available. In this case, either it is known that the integrated code scanners are incapable or unreliable at identifying whether a particular security element has been properly addressed by the code, or the ability of the integrated code scanners at identifying whether a particular security element has been properly addressed is unknown. A "Verification No Status" verification indicates that the controls and mitigation instructions associated with the security task need additional work to confirm as verified. Manual testing or an additional code scanner with increased capabilities to detect the security weakness particular to the security task may be further integrated to perform a more thorough and targeted code evaluation. Details of the verification results can be provided to the developer to direct further efforts.

Particular security elements may be further categorized as requiring manual verification based on knowledge that these elements are not adequately detectable and/or testable by automated code scanners. A sort for security tasks in the security task list for tasks that require manual verification using a task filter can identify which security tasks are best suited and require human intervention for further analysis and verification. The knowledge database comprising which security elements require human verification coupled with the prioritization engine thus provides a prioritized task list and verification confidence for developers to address, which optimizes use of valuable developer time and guides developer attention to the remediation of higher risk security tasks not well identified by automated tools.

Task completion can be logged 122 to provide tangible security audit evidence and trace compliance with security standards. A task verification is an extra step to confirm that a best practice or control has been implemented according to its specification. Verification can be assigned manually or automatically via scanner feedback. Code scanner integration can further identify code associated with a task and provide pass/not pass based on that scanner, as well as dynamically re-checking the code throughout the SDLC to bring forward any security tasks that have failed later verification. Other data can be collected, such as which developer resolved a particular task, and how long it took them to complete it, and the time and date of verification, further providing tracking and accountability for performing software security activities. Identification that individual standards were followed provides traceability and allows SDLC stakeholders to communicate their completion standard for each phase. Once a standard or task has been completed it can be so designated by manually clicking a button or entering data, giving project teams auditability as to which user and at what time has completed which actions. Project managers can track if developers have followed secure programming guidelines and secure development standards. The task list also allows for multiple users to update the system and complete tasks concurrently and provide the ability to freeze changing of the project properties.

Enterprise-wide compliance for application security relevant legislation and/or regulation can be updated based on task completion. In particular, dashboard views can show compliance status to PCI DSS, NERC CIP, GLBA, for the project applications. Specific auditing and regulatory guidelines can be generated and traced for later use to generate required reporting, and additional data may be collected on when guidelines are employed, implemented, and tested, and by whom. Reports of compliance can also be generated for audit purposes as well as regulatory purposes, such as demonstrating compliance to requirements, implementation, and testing guidelines, in situations in which compliance with, for example PCI-DSS (Payment Card Industry Data Security Standards) and HIPAA (Health Insurance Portability and Accountability Act of 1996) is needed. Requirements and their status can also be exported into requirements and risk tracking systems so that analysts can centrally store and track their security requirements.

A database management utility linked to the knowledge database can be interfaced via a web application to permit an authorized developer to link to the web application through a computing device, enter data relating to building the software application, be presented with suggestive security content, and automatically generate security context pertaining to the software application. A matching operator can be used to dynamically and iteratively add tasks to the task list based on the identified security context. The knowledge database can be hosted locally, or can be web-based or cloud based. The knowledge database is updated regularly with knowledge of and remediation of any breach, bug or vulnerability such that updated security requirements can be quickly added to the prioritized task list of a project should a breach become known that requires immediate action. The knowledge database can also provide guidance in a centralized manner to the task lists of developers for immediate remediation, such as updated requirements for all phases of the SDLC integrating changes to technology and accounting for newly discovered vulnerabilities, confirmed attacks, and growing the repository of knowledge in the knowledge database.

In one implementation, a web application that runs the system can be provided to enables developer access to the security task list associated with a particular software project. The system authenticates the user to make sure they have access to the relevant project space and the developer is authorized to view a selected or complete task list, depending on their security or business role. The web application pulls the security requirements, status of remediation of each requirement, and any comments or notes regarding the task remediation, including supporting artifacts and any verification or validation documentation, and presents them to the developer. Navigation of the web application can be provided through a web browser, with services from a back end tool implemented using, for example, a Django web application framework which is based on the Python programming language. The tool can also be built on top of a Model Viewing Controller ("MVC") framework, other application frameworks, or no framework.

The present system can also integrate with other application lifecycle management (ALM) tools which provide a work ticketing system to describe and prioritize developer work. In one embodiment, the security task list can also be exported as a single software development guidance document or ALM tool, such as Atlassian JIRA™. In an ALM, the security requirements task list can be synchronized with the ALM tool to allow security stakeholders to push requirements within the ALM tool into a developer's workflow with prioritization, best practices, guidance and risk analysis required for a developer to implement it. The developer can continue to work inside the ALM tool and as work is completed, the present system can be kept up to date with the status of corresponding work and requirements. A two-way synchronization between the present system and an ALM tool therefore enables developers to communicate the priority and security work to team members in the system already implemented at a client site. An application programming interface (API) can also be used to build a custom client application which provides directed guidance and requirements particular to a client project portfolio. The API gives external programmatic access to the data and behaviours of the system such that queries and instructions can be made to the system and the user can be presented with an updated task list. The developer can also export the security requirements task list as a static electronic document.

Figure 2:
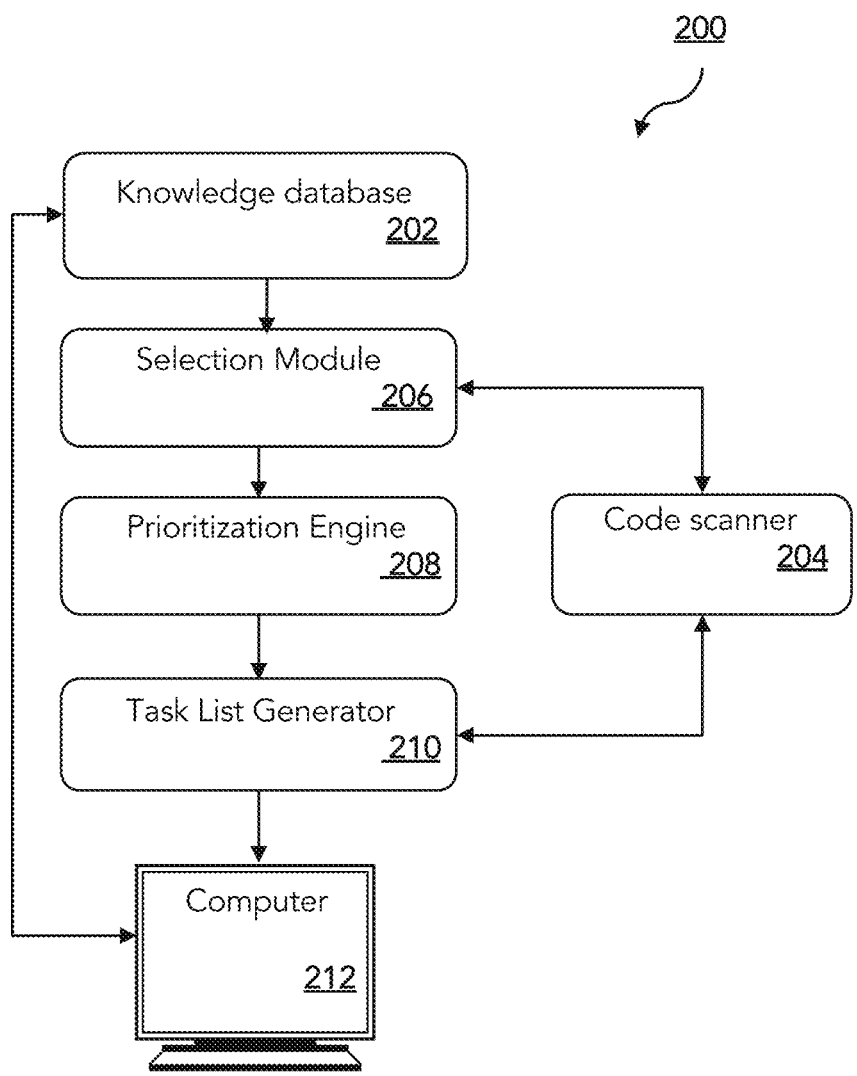
FIG. 2 is a block diagram illustrating a computer system for identifying security requirements and addressing software application vulnerabilities.

FIG. 2 is a block diagram illustrating a system 200 for identifying security requirements and addressing software application vulnerabilities. The system provides for security risk identification in a software application and throughout a software lifecycle such that security requirements can be identified and updated according to risk assessment. A security elements knowledge database 202 contains security requirement information for a wide variety of software applications, contexts, and implementations and is updated regularly to accommodate real-time security challenges. The knowledge database 202 comprises a plurality of security elements, with each security element having an identification of a security risk or regulatory requirement and a recommended remediation of the security risk or mechanism of addressing the regulatory requirement. Each security element in the knowledge database has tags delineating its relevance to a particular software context so that the security requirements for a particular software application can be generated based on identification of the context of the software application. The security elements in the knowledge database 202 can relate to, for example, general relevant security requirements, guidelines on secure architecture design, general development standards for different development platforms and technologies, sample tested code for implementing the standards, lists of security test cases and/or check lists to enable non-expert developers to systematically test security requirements, teaching modules, application life cycle management tracking, and bug tracking integration tools. Without being bound by theory, that one strength of the presently described knowledge database is that changes to security regulations, occurrence of malware, and security element updates can be rapidly updated by updating the security elements in the knowledge database and these can be pushed to the security requirements task list for appropriate software application management along with a security risk assessment. In this fashion, updated security requirements can be prioritized on the application-specific task list for a software application. Developers can therefore be rapidly alerted to security updates relevant to each software application based on previously defined software context and be provided with remediation to avoid security risk in the software application. In an environment where multiple software applications are being developed and/or maintained by a single team, the team can also be quickly made aware of security updates as they are added to the knowledge database, with priority alerts for high priority requirements to respond quickly in high risk situations.

Not all security elements in the knowledge database are applicable to every software application, as each software application has a unique combination of language, industry, environment and technology requirements, also referred to as the software context. Accordingly, a security element selection module 206 is employed for selecting a plurality of security requirements for the software application from the plurality of security elements in the knowledge database, with the selected security requirements applicable to the software application under development or maintenance.

The knowledge database 202 can be accessed with a database management utility. In the case where the knowledge database 202 is stored external to the computer, a web server can permit an authorized user to link to a web application by means of the Internet and computer 212. The computer 212 or other similar electronic device can be used for coding the software application by the developer, and can be a single computing device, a plurality of computers or electronic devices being used by a plurality of developers, or a distributed network or computers. Computer 212 comprises a processor and a memory operatively connected to the processor, and can further be connected to the Internet. The computer 212 may also have access the knowledge database 204 and be able to access one or a plurality of different projects at the same time. One or a plurality of code scanners 204 receives the code of the software application for identifying at least one code vulnerability in the software application code. Each of the code scanners 204 can be, for example, a dynamic application security testing scanner (DAST), a static application security testing scanner (SAST), Application Vulnerability Correlation tool, aggregating scanners, Interactive Application Security Testing (IAST) scanners, Runtime Application Security Protection (RASP) scanners, or combination thereof. The code scanner 204 can also be used to analyze the scanned code to provide further context information to assist the selection module in selecting security requirements for the software application.

Figure 5:
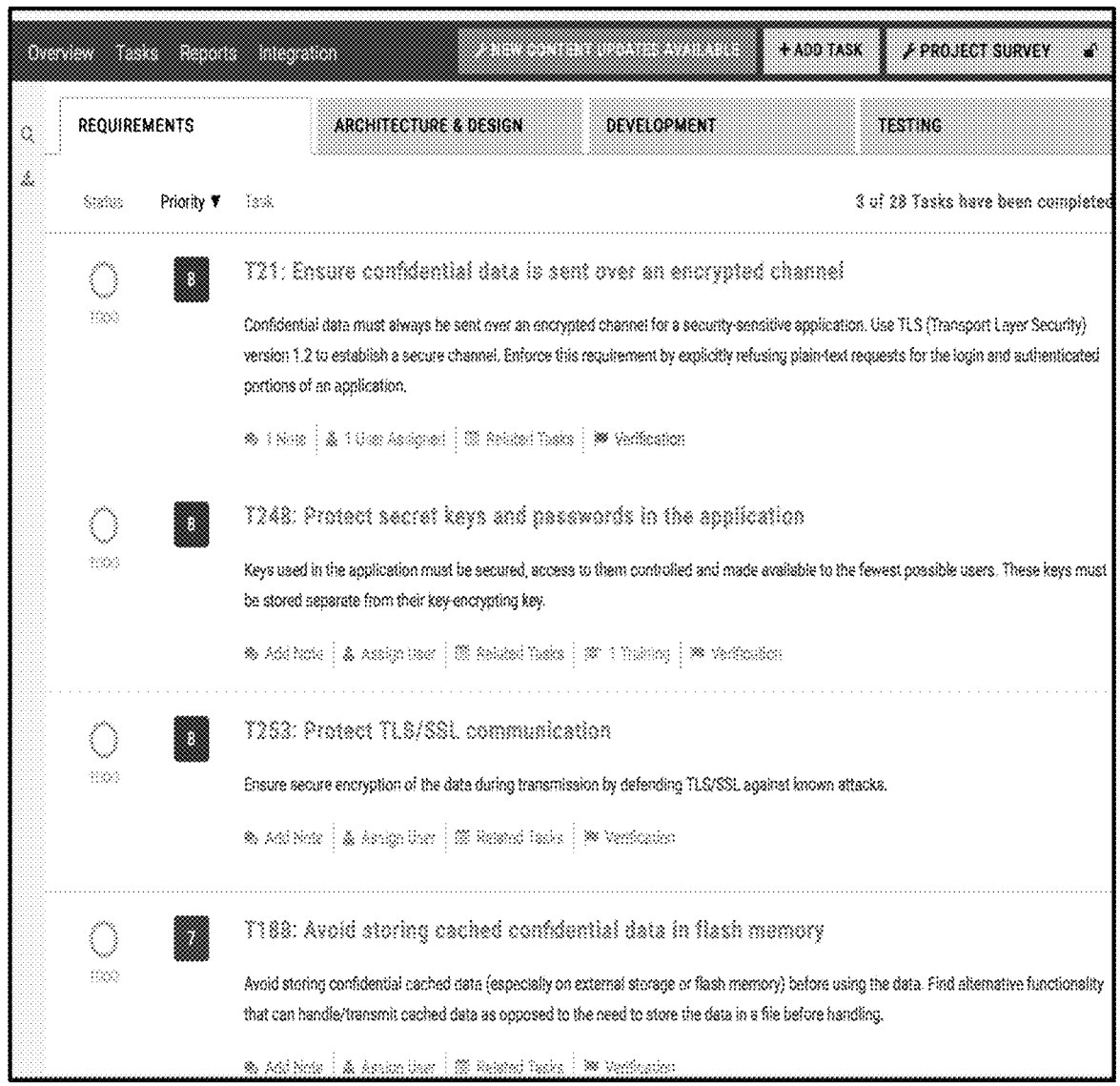
FIG. 5 is an example of a prioritized task list for a specific project.

In each of the security elements in the knowledge database 202 is stored information on which security elements require human verification when coupled with particular code scanners and which code vulnerabilities associated with each security requirement are adequately identified by those code scanners. A prioritization engine 208 prioritizes the plurality of selected security requirements, the prioritizing based on the security risk of each of the selected security requirements and a confidence level of the effectiveness of the code scanner at identifying the code vulnerability associated with each selected security requirement. A task list generator 210 generates a task list for the software application project, the task list comprising the prioritized list of the selected security requirements as provided by the prioritization engine 208. The task list generated by the task list generator 210 can be stored on the computer, or on another electronic device or system, and can be accessed by and presented to a developer in a dashboard, an example of which is shown in FIG. 5.

Preferably, the system also comprises a verification module to collect information on how each security requirement was addressed. The verification data can include but is not limited to which developer(s) worked on each security requirement, which code scanners were used, when the security requirement was addressed, and which remediation task(s) were completed to verify task completion. Each of the pieces of information in the verification module can also be tagged to enable later searching of security requirement verification based on the tags.

Figure 3:
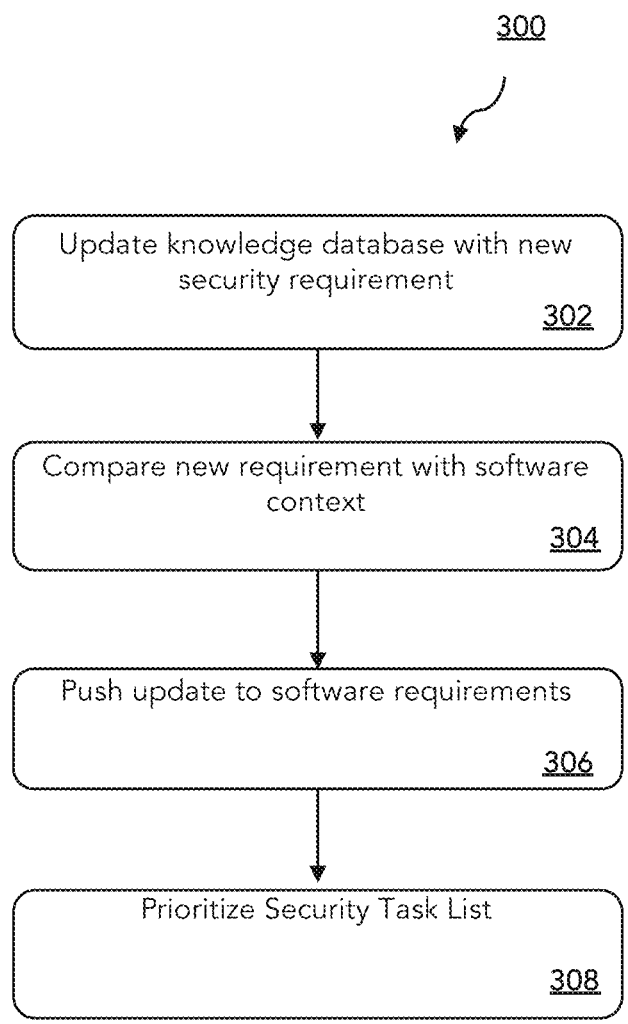
FIG. 3 is a flowchart illustrating a method for identifying security requirements and addressing software application vulnerabilities during a software lifecycle after software release.

FIG. 3 is a flowchart illustrating a method for identifying security requirements and addressing software application vulnerabilities during a software lifecycle after software release or deployment 300. The knowledge database is updated by adding to an existing security element or adding at least one new security element 302 along with tags that identify when the security element is to be applied in a software application based on software context. Updates to the knowledge database periodically address new weaknesses reported and found, and new standards and requirements required for software security compliance. Based on the already identified software context of the application, new applicable tasks can be added to the task list for software application update. In a particular software application, the system then compares the new or updated security element with the software context 304 of a software application and, if applicable, adds a new or updated security requirement to the software application task list. If applicable, the updated task is then pushed to the software requirements 306 for the software application. The new or updated task including the security requirement is prioritized 308 on the security requirement task list for the software application. Should there be more than one task for updating the software application, each new task is prioritized on the task list 308. It is evident that using this system and method multiple projects can be updated concurrently based on previously defined software application context and/or code scanner status.

Figure 4:
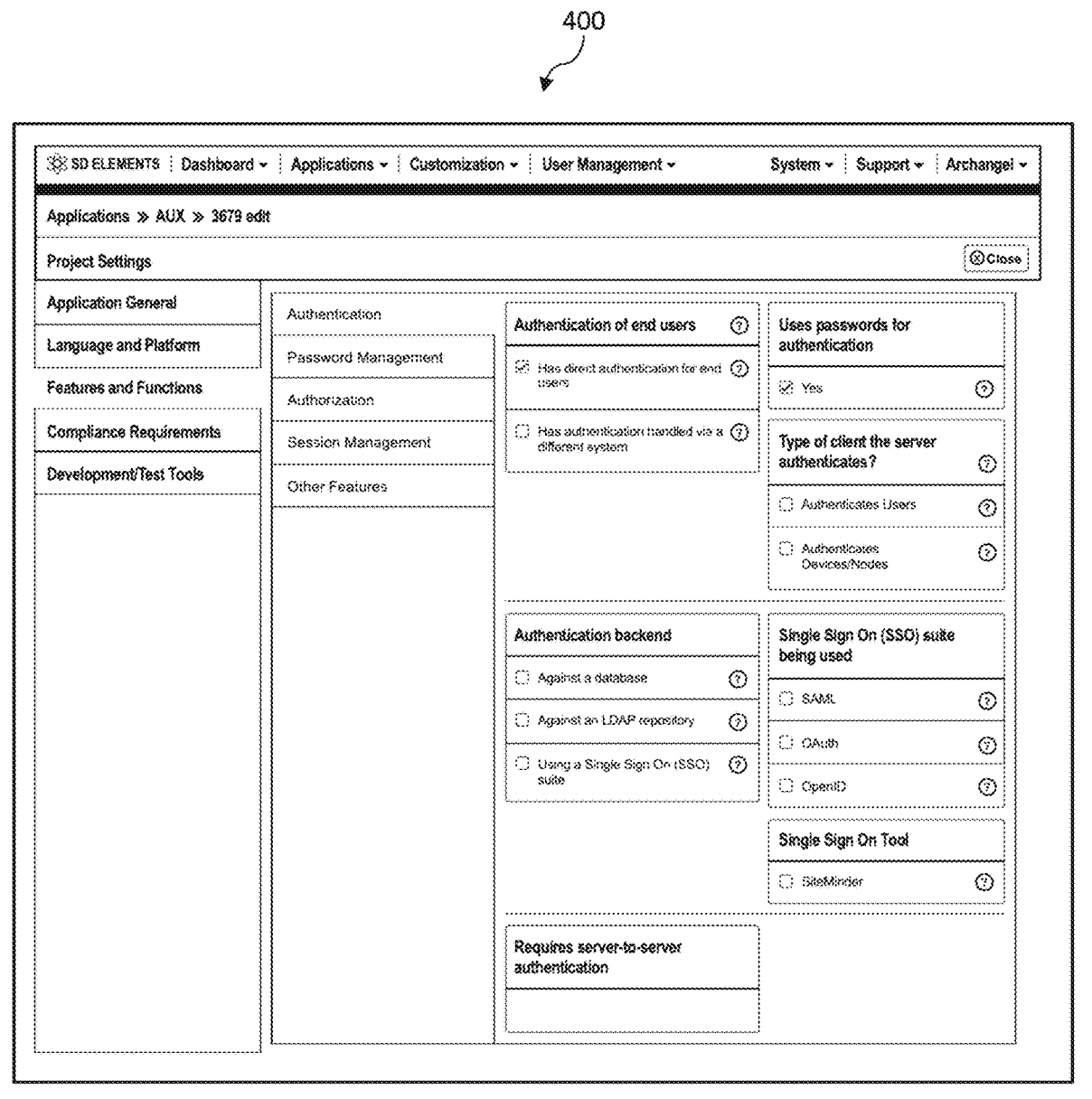

FIG. 4 is an example implementation of software context identification for a specific project on a developer graphical user interface 400. As shown, a graphical user interface can be provided to developers on a variety of platforms to enable developers to select context information about the software application project. A cascading set of information suggests context features to select a set of security requirements required to develop and maintain the software application during its lifecycle. The software context can be updated should the project change during development or deployment and the project settings can be updated accordingly to provide the security requirements task list.

FIG. 5 is an example of a prioritized task list for a specific project, displayed on a developer graphical user interface 500. The prioritization of each security requirement is shown sorted with the tasks of highest priority at the top, along with a brief description of the security task to be done. Developers can select a next task to be done based on priority, their own competence, whether or not training modules are available, or other internal priorities. Managers can also assign certain tasks to particular developers, and based on the status or role of the developer in the company different users may have different task lists for the same project.

Figure 6:
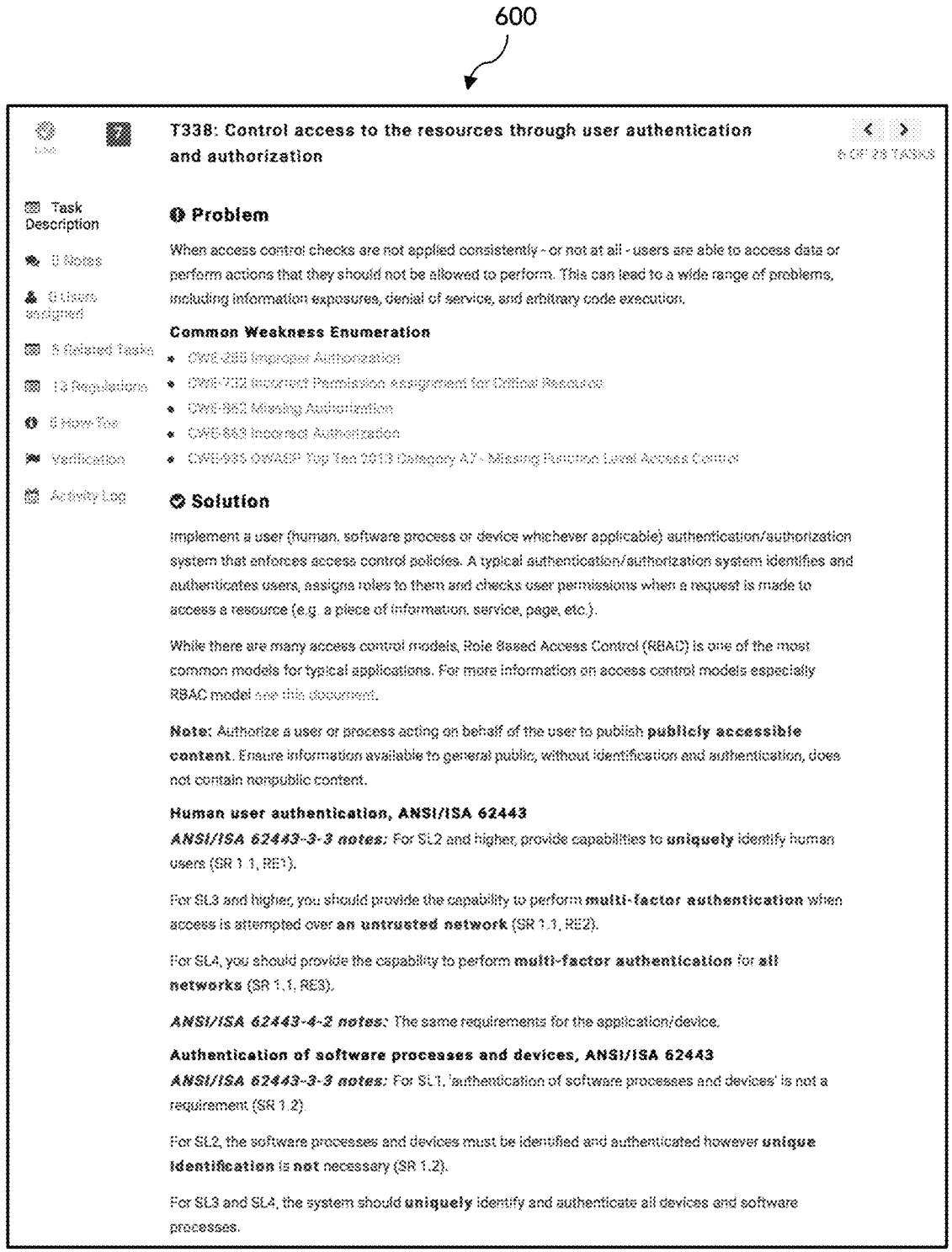
FIG. 6 is an example security task comprising instructions for addressing a particular vulnerability in a software project.

FIG. 6 is an example security requirement task as displayed on a developer graphical user interface 600 comprising instructions for addressing a particular vulnerability in the software application. The security requirement contains an identification of the problem, identification of a corresponding Common Weakness Enumeration (CWE) weakness, and guidance on how to address the security requirement in the software application project. Other information can be presented in the security task requirements such as, for example, tailored guidelines on secure architecture design, development standards, sample tested code for implementing the standards, and security test cases and/or check lists to enable non-expert developers to systematically test security requirements, failure conditions, guidelines about testing tools, and guidance videos.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A method for identifying security risks in a software application, the method comprising:
    identifying a software context relating to the environment of the software application;
    selecting a set of security requirements for the software application based on the software context, the security requirements selected from a security knowledge database comprising security elements;
    generating a prioritized task list comprising the customized set of selected security requirements;
    scanning code of the software application with at least one code scanner;
    identifying at least one security requirement in the set of security requirements that has passed the test of the code scanner for which the code scanner is known to be capable of detecting;
    identifying the strength of the code scanner to discover a particular code vulnerability associated with the at least one security requirement to provide a level of confidence that the code scanner will have discovered the particular code vulnerability;
    validating that the at least one security requirement is addressed and in a compliance state when the level of confidence that the code scanner is capable of detecting the particular code vulnerability in the code of the software application is high; and
    automatically updating the status of the at least one security requirement in the prioritized task list which has been validated to be in the compliance state to indicate a verified compliance state for the at least one security requirement.

2. The method of claim 1, further comprising calling upon a particular code scanner which has high confidence capability for identifying the particular code vulnerability to verify that the security requirement has the verified compliance state.

3. The method of claim 1, further comprising indicating a confidence level of risk identification of at least one of the selected security requirements based on capability of the code scanner to verify a compliance state of the security requirement.

4. The method of claim 1, further comprising identifying at least one code vulnerability not identified by the at least one security scanner.

5. The method of claim 1, wherein each of the security requirements comprises instructions to address the security requirement.

6. The method of claim 1, further comprising scanning code of the software application with a plurality of code scanners.

7. The method of claim 5, further comprising validating that a security requirement has been verified using the instructions to address the security requirement.

8. The method of claim 1, wherein the at least one code scanner is one or more of a static application security testing tool, dynamic application security testing tool, interactive application security testing scanners, runtime application security protection scanner, and an Application Vulnerability Correlation (AVC) tool.

9. The method of claim 1, further comprising confirming the verification with an additional code scanner.

10. The method of claim 1, further comprising confirming the verified compliance state with a human check.

11. The method of claim 1, further comprising assigning at least one security requirement with a verified compliance state with a verification status which is one of a plurality of status levels.

12. The method of claim 1, wherein the environment of the software application is one or more of a coding environment and a system environment.

13. The method of claim 1, further comprising:
    identifying a new security requirement for the software application;
    scanning the software code of the software application with the code scanner;
    determining if the new security requirement is adequately identified by the code scanner; and
    updating the task list based on identification of the new security requirement.

14. The method of claim 1, further comprising generating a standards report identifying each security requirement of the software application and how each security requirement has been met.

15. The method of claim 1, wherein the database of security elements comprises regulatory elements.

16. The method of claim 1, further comprising prioritizing the security requirements based security risk.

17. The method of claim 1, further comprising regenerating the prioritized task list by updating at least one of the selected security requirements.

18. The method of claim 1, wherein the code scanner identifies at least one software context relating to the environment of the software application.

19. The method of claim 1, further comprising prioritizing the selected security requirements based on security risk, expedient order for software design, lifecycle stage of the project or software, test coverage by code scanners, or a combination thereof.

20. A computing device comprising a processor and a memory coupled to the processor, wherein the processor is configured to execute programmed instructions stored in the memory to:

identify a software context relating to the environment of the software application;

select a set of security requirements for the software application based on the software context, the security requirements selected from a security knowledge database comprising security elements;

generate a prioritized task list comprising the customized set of selected security requirements;

scan code of the software application with at least one code scanner;

identify at least one security requirement in the set of security requirements that has passed the test of the code scanner for which the code scanner is known to be capable of detecting;

identify the strength of the code scanner to discover a particular code vulnerability associated with the at least one security requirement to provide a level of confidence that the code scanner will have discovered the particular code vulnerability;

validate that the at least one security requirement is addressed and in a compliance state when the level of confidence that the code scanner is capable of detecting the particular code vulnerability in the code of the software application is high; and automatically update the status of the at least one security requirement in the prioritized task list which has been validated to be in the compliance state to indicate a verified compliance state for the at least one security requirement.

21. A non-transitory computer-readable storage medium having one or more instructions thereon for identifying software application vulnerabilities during a software lifecycle, the instructions when executed by a processor causing the processor to:

identify a software context relating to the environment of the software application;

select a set of security requirements for the software application based on the software context, the security requirements selected from a security knowledge database comprising security elements;

generate a prioritized task list comprising the customized set of selected security requirements;

scan code of the software application with at least one code scanner;

identify at least one security requirement in the set of security requirements that has passed the test of the code scanner for which the code scanner is known to be capable of detecting;

identify the strength of the code scanner to discover a particular code vulnerability associated with the at least one security requirement to provide a level of confidence that the code scanner will have discovered the particular code vulnerability;

validate that the at least one security requirement is addressed and in a compliance state when the level of confidence that the code scanner is capable of detecting the particular code vulnerability in the code of the software application is high; and automatically update the status of the at least one security requirement in the prioritized task list which has been validated to be in the compliance state to indicate a verified compliance state for the at least one security requirement.

* * * * *